(12) United States Patent
Jung et al.

(10) Patent No.: US 8,008,369 B2
(45) Date of Patent: Aug. 30, 2011

(54) INK SET, INK CARTRIDGE INCLUDING THE SAME, AND INKJET RECORDING APPARATUS EMPLOYING THE SAME

(75) Inventors: Jae-yoon Jung, Suwon-si (KR); Seung-min Ryu, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 420 days.

(21) Appl. No.: 12/260,381

(22) Filed: Oct. 29, 2008

(65) Prior Publication Data
US 2009/0247669 A1 Oct. 1, 2009

(30) Foreign Application Priority Data
Mar. 27, 2008 (KR) .................. 10-2008-0028495

(51) Int. Cl.
*C09D 11/10* (2006.01)
(52) U.S. Cl. ....... 523/160; 523/200; 523/205; 106/31.6; 347/100
(58) Field of Classification Search .............. 523/160, 523/161, 200, 205; 347/100; 106/31.13, 106/31.6
See application file for complete search history.

*Primary Examiner* — David Wu
*Assistant Examiner* — Vu A Nguyen
(74) *Attorney, Agent, or Firm* — Stanzione & Kim, LLP

(57) ABSTRACT

An ink set includes an ink composition including an encapsulated black pigment in which a black pigment is coated with a polymer resin.

12 Claims, 2 Drawing Sheets

INK SET, INK CARTRIDGE INCLUDING THE SAME, AND INKJET RECORDING APPARATUS EMPLOYING THE SAME

CROSS-REFERENCE TO RELATED APPLICATIONS

This application claims priority under 35 U.S.C. §119(a) from Korean Patent Application No. 10-2008-0028495, filed on Mar. 27, 2008, in the Korean Intellectual Property Office, the disclosure of which is incorporated herein in its entirety by reference.

BACKGROUND OF THE INVENTION

1. Field of the Invention

The present general inventive concept relates to an ink set including an ink composition including an encapsulated black pigment in which a black pigment is coated with a polymer resin and an ink composition including an encapsulated color pigment in which a color pigment is coated with a polymer resin, an ink cartridge including the ink set, and an inkjet recording apparatus including the ink cartridge, and more particularly, to an ink set that includes an ink composition including an encapsulated black pigment in which a black pigment is coated with a polymer resin and an ink composition including an encapsulated color pigment in which a color pigment is coated with a polymer resin, which is used to obtain high-quality images without nozzle clogging in an inkjet printing head, and in which a volume average diameter and glass transition temperature of the encapsulated black and color pigments are controlled.

2. Description of the Related Art

Inkjet ink includes a dye or a pigment. Dye is used to obtain high-quality color images but the obtained images cannot be preserved for a long time due to poor resistance of the dye to water and light. The pigment has good resistance to the water and the light but a resistance thereof to abrasion is low. In addition, the pigment has a narrow color gamut and a low optical density (OD) due to a shielding effect, and thus images obtained using pigment alone have a low-image quality. These problems can be resolved by using an encapsulating method in which particles of pigment are covered with a non-aqueous polymer. Encapsulated dye has a better durability, and encapsulated pigment has a wider color gamut. In addition, printed images obtained using the encapsulated pigment have a high resistance to abrasion and high image quality.

Meanwhile, presently, inkjet printers are widely available in homes and offices and have been developed such that inkjet printed images have as high quality as images obtained by silver-salt photography. An ink composition used in inkjet printers may have various properties according to an application thereof.

Text printing requires a high degree of visuality and a high OD. Accordingly, when printing text, a content of ejected ink should be high, and particles of a pigment should be large because, in general, OD is increased as the particle size of the pigment is increased. In addition, a polymer resin coated on the pigment should have a high glass transition temperature ($T_g$) because ink bleeding should be maintained at low levels on printing media.

Photo or picture color printing requires small nozzles to embody high-resolution images. Therefore, the pigment should be small. However, since conventional pigment is too small, the conventional pigment easily permeates into printing media and the OD of the printed images is decreased.

Alternatively, as for encapsulated pigment ink, a polymer coated on a pigment acts as an adhesive between the encapsulated pigment ink and printing media and problems caused by the permeation of the pigment into printing media can be partially prevented. However, encapsulated pigment ink is less permeable with respect to printing media and thus, a cellulose of a portion of a sheet that does not contact the encapsulated pigment ink is directly exposed and a white hole effect occurs, thereby decreasing the image quality of the printed image.

When the pigment is coated with a polymer having a low glass transition temperature ($T_g$), particles of the pigment run on a printing medium and thus, direct exposure of a fabric of the printing medium can be prevented and high-quality color images can be obtained.

Meanwhile, in conventional inkjet printing heads, the size of black nozzles is equal to a size of color nozzles. However, in recently developed inkjet printing heads, the size of black nozzles is larger than the size of color nozzles to obtain both clear text and clear color images. However, conventional encapsulated color ink includes black and color ink of the same particle size and the same $T_g$, and thus when ejected through a smaller nozzle for color ink, a nozzle clogging phenomenon occurs. In addition, optimal images cannot be obtained according to applications.

Therefore, there is a need to develop an ink set to provide high-quality images by controlling a particle size of a capsulated pigment and $T_g$ of respective ink compositions according to a printing purpose.

SUMMARY OF THE INVENTION

The present general inventive concept provides an ink set to produce high-quality images in an inkjet printing head without nozzle clogging, by controlling a volume average diameter and glass transition temperature of encapsulated black and color pigments.

The present general inventive concept also provides an ink composition including an encapsulated black pigment, as part of the ink set.

The present general inventive concept also provides an ink composition including an encapsulated color pigment, as part of the ink set.

The present general inventive concept also provides an ink cartridge for an inkjet recording apparatus, including the ink set.

The present general inventive concept also provides an inkjet printing apparatus including the ink cartridge.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an ink set including an ink composition including an encapsulated black pigment in which a black pigment is coated with a polymer resin, and an ink composition including an encapsulated color pigment in which a color pigment is coated with a polymer resin, wherein a volume average diameter ($D_1$) of the encapsulated black pigment is in a range of 120 to 150 nm, a glass transition temperature ($T_{g1}$) of the encapsulated black pigment is in a range of 30 to 50° C., a volume average diameter ($D_2$) of the encapsulated color pigment is in a range of 90 to 120 nm, and a glass transition temperature ($T_{g2}$) of the encapsulated color pigment in a range of 10 to 30° C., and wherein $D_1-D_2$ is in a range of 1 to 60 nm, and $T_{g1}-T_{g2}$ is in a range of 1 to 40° C.

The foregoing and/or other aspects and utilities of the general inventive concept may also be achieved by providing an ink composition including an encapsulated black pigment, the encapsulated black pigment including: a black pigment, and a polymer resin coating the black pigment, wherein the encapsulated black pigment has a volume average diameter of 120 to 150 nm and a glass transition temperature of 30 to 50° C.

The foregoing and/or other aspects and utilities of the general inventive concept may also be achieved by providing an ink composition including an encapsulated color pigment, the encapsulated black pigment including: a color pigment and a polymer resin coating the color pigment, wherein the encapsulated color pigment has a volume average diameter of 90 to 120 nm and a glass transition temperature of 10 to 30° C.

The foregoing and/or other aspects and utilities of the general inventive concept may also be achieved by providing an ink cartridge usable with an inkjet recording apparatus, the ink cartridge including an ink storage tank to store an ink set, the inkset including an ink composition including an encapsulated black pigment in which a black pigment is coated with a polymer resin, and an ink composition including an encapsulated color pigment in which a color pigment is coated with a polymer resin, wherein a volume average diameter $(D_1)$ of the encapsulated black pigment is in a range of 120 to 150 nm, a glass transition temperature $(T_{g1})$ of the encapsulated black pigment is in a range of 30 to 50° C., a volume average diameter $(D_2)$ of the encapsulated color pigment is in a range of 90 to 120 nm, and a glass transition temperature $(T_{g2})$ of the encapsulated color pigment in a range of 10 to 30° C., wherein $D_1-D_2$ is in a range of 1 to 60 nm, and $T_{g1}-T_{g2}$ is in a range of 1 to 40° C.

The foregoing and/or other aspects and utilities of the general inventive concept may also be achieved by providing an inkjet recording apparatus including a main body, and an ink cartridge, the ink cartridge removably connected to the main body, the ink cartridge including an ink storage tank to store an ink set, the inkset including an ink composition including an encapsulated black pigment in which a black pigment is coated with a polymer resin, and an ink composition including an encapsulated color pigment in which a color pigment is coated with a polymer resin, and wherein a volume average diameter $(D_1)$ of the encapsulated black pigment is in a range of 120 to 150 nm, a glass transition temperature $(T_{g1})$ of the encapsulated black pigment is in a range of 30 to 50° C., a volume average diameter $(D_2)$ of the encapsulated color pigment is in a range of 90 to 120 nm, and a glass transition temperature $(T_{g2})$ of the encapsulated color pigment in a range of 10 to 30° C., and wherein $D_1-D_2$ is in a range of 1 to 60 nm, and $T_{g1}-T_{g2}$ is in a range of 1 to 40° C.

The foregoing and/or other aspects and utilities of the general inventive concept may also be achieved by providing a black pigment coated with a polymer resin, wherein the polymer coated black resin has at least one of a volume average diameter of 120 to 150 nm and a glass transition temperature of 30 to 50° C.

DETAILED DESCRIPTION OF THE PREFERRED EMBODIMENTS

Figure 1:
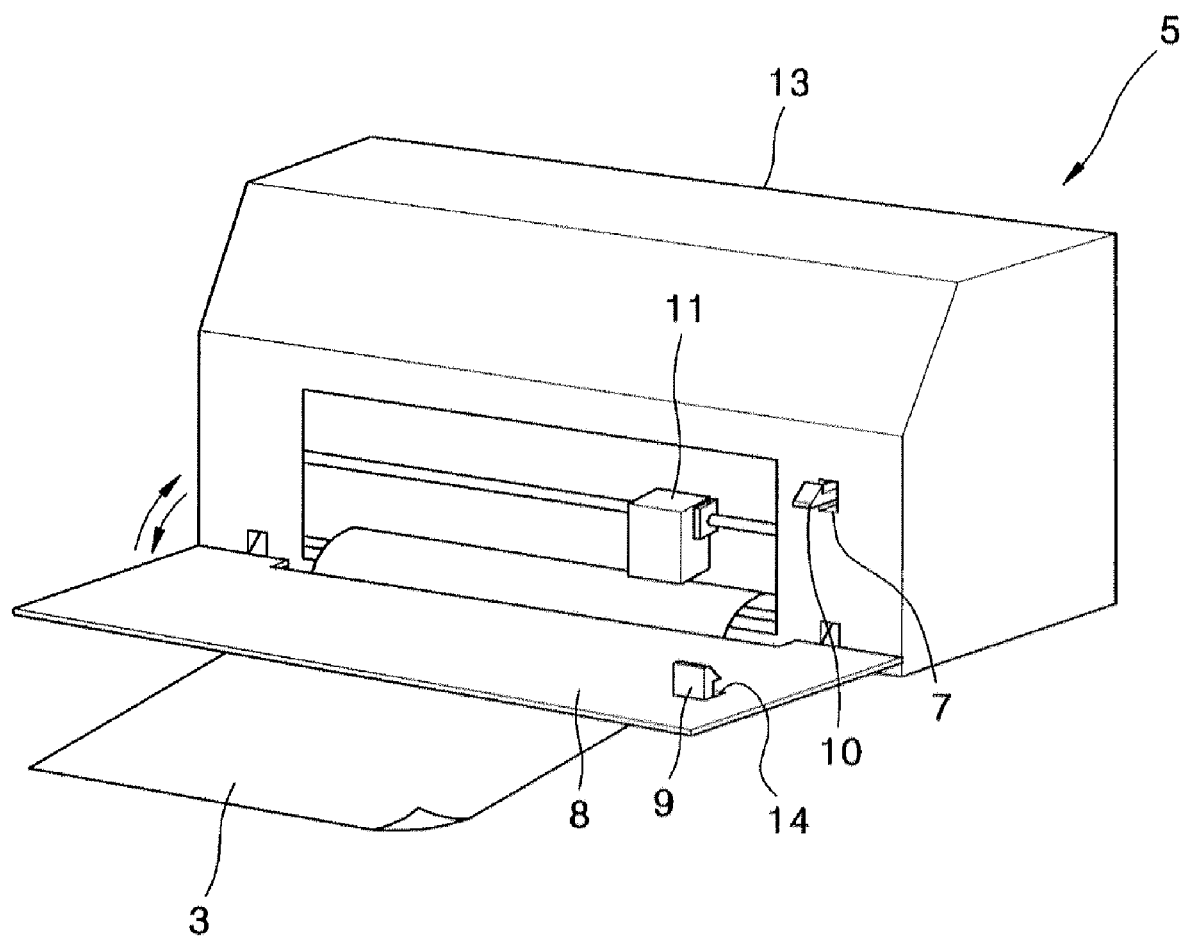
FIG. 1 is a perspective view illustrating an inkjet recording apparatus including an ink cartridge, according to an embodiment of the present general inventive concept.

The present general inventive concept will now be described more fully with reference to the accompanying drawings, in which exemplary embodiments of the general inventive concept are illustrated.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An ink set according to an embodiment of the present general inventive concept includes: an ink composition including an encapsulated black pigment in which a black pigment is coated with a polymer resin; and an ink composition including an encapsulated color pigment in which a color pigment is coated with a polymer resin.

The encapsulated black pigment has a volume average diameter $(D_1)$ ranging from 120 to 150 nm and a glass transition temperature $(T_{g1})$ ranging from 30 to 50° C., and the encapsulated color pigment has a volume average diameter $(D_2)$ ranging from 90 to 120 nm and a glass transition temperature $(T_{g2})$ ranging from 10 to 30° C., wherein $D_1-D_2$ is in a range of 1 to 60 nm and $T_{g1}-T_{g2}$ is in a range of 1 to 40° C.

The black pigment and the color pigment are not limited and can be selected from pigments described hereinafter.

The black pigment may be carbon black. Specifically, the black pigment may be a carbon black prepared using a furnace method or a channel method, or a surface-treated carbon black. The surface-treated carbon black may be cationic, anionic, or neutral, and may have a C1 to C20 hydrocarbonyl group.

The carbon black may have a specific surface area of 50 to 300 m²/g, which is measured using a Brunauer-Emmett-Teller (BET) method, an oil absorption amount of 40 to 150 ml/100 g, which is measured with dibutyl phthalate (DBP), an evaporation amount of 0.5 to 10 weight %, and pH of 2 to 9.

Carbon black having such characteristics is commercially available. Examples of commercially available carbon black include No. 2300, No. 900, MCF 88, No. 40, No. 52, MA 7, MA 8 and No. 2200B (produced by Mitsubishi Kagaku Co.); RAVEN 1255 (produced by Columbian Carbon Japan Limited); REGAL 400R, REGAL 660R, MOGUL L, Cabojet 200, and Cabojet 300 (produced by Cabot Co.); and Color Black FW1, Black FW18, Color Black S170, Color Black S150, Printex 35, and Printex U (produced by Degussa Co.).

The color pigment used in the present embodiment may be a yellow pigment, a magenta pigment, or a cyan pigment.

The yellow pigment may be C.I. Pigment Yellow 1, C.I. Pigment Yellow 3, C.I. Pigment Yellow 13, C.I. Pigment Yellow 16, or C.I. Pigment Yellow 83.

The magenta pigment may be C.I. Pigment Red 5, C.I. Pigment Red 7, C.I. Pigment Red 12, C.I. Pigment Red 48, C.I. Pigment Red 57, C.I. Pigment Red 112, or C.I. Pigment Violet 19. For example, the magenta pigment may be a quinacridone pigment.

The cyan pigment may be C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, or C.I. Vat Blue 6. For example, the cyan pigment may be a metallic phthalocyanine pigment, preferably a copper phthalocyanine pigment. However, the cyan pigment can also be other pigments.

A volume average diameter of each of the black and color pigments may be in a range of 5 to 110 nm, specifically, 50 to 100 nm. When the volume average diameter of each of the black and color pigments is less than 5 nm, particles of the black and color pigments agglomerate with each other due to Van der Waals force, and, when used in image printing, particles of the black and color pigments may permeate between paper celluose to cause a shielding effect, thereby decreasing image quality. When the volume average diameter of each of the black and color pigments is greater than 120 nm, the sizes of the black and color pigments may be increased when a polymer resin is coated thereon in an encapsulating process and nozzles are clogged.

The polymer resin used to cover the black pigment and color pigment may be dependent upon an absorbing property with respect to the black and color pigments and solubility with respect to a polymerizable unsaturated monomer used. For example, the polymer resin may be vinyl resin such as a vinyl chloride resin, an acetic acid resin, a vinyl acetic acid resin, a vinyl chloride/vinyl acetic acid copolymer resin, a polyvinyl acetal resin, a cellulose resin, a polyester resin, a poly urethane resin, a poly amide resin, or an acryl resin. Specifically, use of an acryl resin is desirable in terms of stability of the black and color pigments with respect to the polymerizable unsaturated monomer and convenience to control particles of the black and color pigments and $T_g$. In some cases, the polymer resin may be a combination of at least two types of non-aqueous resins.

In each of the encapsulated black pigment and encapsulated color pigment, the polymer resin coated on the pigment may be formed by polymerizing a polymerization composition including a polymerizable unsaturated monomer, a water-soluble medium, a pigment, and a polymerization initiator.

The polymerization reaction may be an emulsion polymerization reaction using a water-soluble polymerization initiator or a suspension polymerization reaction using a fat-soluble polymerization initiator. Specifically, use of an emulsion polymerization reaction is desirable in terms of particle size and convenience to control the polymerization reaction.

The emulsion polymerization reaction may be performed using a direct emulsion method, a natural emulsion method, or a phase transition emulsion method.

In the direct emulsion method, a pigment suspension prepared by suspending a pigment with a polymerizable unsaturated monomer is emulsified with a disperser, such as a homomixer, a line mixer, or a high-pressure homogenizer, in an emulsifying agent-containing water-soluble medium. In the natural emulsion method, an emulsifying agent is added to a pigment suspension prepared by suspending a pigment with a polymerizable unsaturated monomer, and then a large amount of water is added thereto. In the phase-transition emulsion method, an emulsifying agent is added to a pigment suspension prepared by suspending a pigment with a polymerizable unsaturated monomer, and then water is gradually added thereto while mixing the resultant mixture.

The polymerizable unsaturated monomer may be vinyl aromatic hydrocarbone, (meth)acryl ester, (meth)acrylamide, alkyl-substituted (meth)acrylamide, N-substituted maleimide, maleic anhydride, (meth)acrylonitrile, methyl vinyl ketone, a vinyl acetate, or vinyllidene chloride.

The vinyl aromatic hydrocarbone may be styrene, a-methylstyrene, o-, m- or p-chlorostyrene, p-ethylstyrene, divinylbenzene, or a combination thereof, but is not limited thereto.

The (meth)acryl ester may be methyl acrylate, ethyl acrylate, butyl acrylate, 2-ethylhexyl acrylate, cyclohexyl acrylate, phenyl acrylate, methyl methacrylate, hexyl methacrylate, 2-ethylhexyl methacrylate, ethyl β-hydroxyacrylate, propyl y-hydroxyacrylate, butyl δ-hydroxyacrylate, ethyl β-hydroxymethacrylate, ethylene glycol dimethacrylate, or tetraethylene glycol dimethacrylate, but is not limited thereto.

The polymerizable unsaturated monomers described above may be used alone or in a combination thereof. In addition, it would be obvious to one of ordinary skill in the art to further add a small amount of a water-soluble monomer to the polymerization composition in order to improve characteristics of an encapsulated pigment according to applications. Examples of the water-soluble monomer may include an anionic group, such as a sulfonic acid group, a phosphoric acid group, or a carboxylic acid group. Those acid groups may be present in a form of an alkali metallic salt, such as a sodium salt, an ammonium salt, or an amine salt, or an arbitrary form of a free acid. Examples of the acid groups described above include a styrenesulfonic acid, a sodium styrenesulfonic acid, a 2-acrylamido-2-methylpropensulfonic acid, 2-hydroxymethylmethacryloyl phosphate, 3-chloro-2-hydroxypropymethacryloyl phosphate, an acrylic acid, a methacrylic acid, a fumaric acid, a crotonic acid, a tetrahydroterephthalic acid, an itaconic acid, and a maleic acid.

The water-soluble medium may be water or a solution mixture of water and an organic solvent. A content of the water-soluble medium may be in a range of 100 to 1,000 parts by weight, specifically 400 to 700 parts by weight, based on 100 parts by weight of the polymerizable unsaturated monomer. When the content of the water-soluble medium is less than 100 parts by weight based on 100 parts by weight of the polymerizable unsaturated monomer, the polymerization reaction speed is too high and the polymer resin encapsulates each of the black and color pigments to a large thickness. Alternatively, when the content of the water-soluble medium is greater than 1,000 parts by weight based on 100 parts by weight of the polymerizable unsaturated monomer, moving the polymerizable unsaturated monomer to each reaction site is difficult and thus, the polymerization reaction speed is too low and the pigment may be incompletely coated with the polymer resin.

A content of each of the black and color pigments may be in a range of 20 to 500 parts by weight, specifically 50 to 400 parts by weight based on 100 parts by weight of the polymerizable unsaturated monomer. When the content of each of the black and color pigments is less than 20 parts by weight based on 100 parts by weight of the polymerizable unsaturated monomer, the content of the polymer resin coating each of the black and color pigments is too high, and an original color of each of the black and color pigments may not be expressed. Alternatively, when the content of each of the black and color pigments is greater than 500 parts by weight, a content of the polymer resin coating each of the black and color pigments is too low, and each of the black and color pigments may not be fully encapsulated.

The polymerization initiator may be a water-soluble or fat-soluble persulfate, peroxide, an azo compound, or a mixture of peroxide and a reducing agent. For example, the polymerization initiator may be a redox composition including persulfate. Examples of the polymerization initiator include ammonium persulfate, potassium persulfate, sodium persulfate, hydrogen peroxide, t-butyl hydro peroxide, t-butyl peroxybenzoate, 2,2-azobis-isobutyronitrile, 2,2-azobis(2-diaminopropane) hydrochloride, and 2,2-azobis(2,4-dimethylvaleronitrile).

A content of the polymerization initiator may be in a range of 0.05 to 3 parts by weight, specifically 0.5 to 1.5 parts by weight, based on 100 parts by weight of the polymerizable unsaturated monomer. When the content of the polymerization initiator is less than 0.5 parts by weight based on 100 parts by weight of the polymerizable unsaturated monomer, the polymerization reaction may not be initiated well and the polymerization reaction speed is too low. Alternatively, when the content of the polymerization initiator is greater than 3 parts by weight based on 100 parts by weight of the polymerizable unsaturated monomer, the polymerization reaction speed is too high and controlling the polymerization reaction is difficult.

The polymerization initiator may be used together with other reaction materials involved in the polymerization reaction, that is, with the polymerizable unsaturated monomer, the water-soluble medium, and each of the black and color pigments, when the reaction begins. Alternatively, the polymerization initiator may be used after the other reaction materials are emulsified or suspended and the temperature is increased. When the polymerization initiator is used at the beginning of the reaction, controlling the reaction speed is difficult. Alternatively, when the polymerization initiator is used after the other reaction materials are emulsified or suspended and the temperature is increased, a reaction speed can be easily controlled.

When the polymer resin coating the pigment is formed using an emulsifying polymerization method, the polymerization composition may further include an emulsifying agent. The emulsifying agent may be non-ionic, anionic, or ampholytic emulsifying agent.

A content of the emulsifying agent may be in a range of 0.01 to 10 parts by weight, specifically 0.1 to 7 parts by weight, based on 100 parts by weight of the polymerizable unsaturated monomer. When the content of the emulsifying agent is less than 0.01 parts by weight based on 100 parts by weight of the polymerizable unsaturated monomer, sufficient emulsification cannot be obtained because a resultant concentration of the emulsifying agent is equal to or less than a critical emulsification concentration. Alternatively, when the content of the emulsifying agent is greater than 10 parts by weight based on 100 parts by weight of the polymerizable unsaturated monomer, foam is generated due to excess emulsifying agent after the polymerization reaction is completed.

In addition, in the method of preparing the encapsulated pigment, the polymerization composition further includes a cross-linkable monomer. That is, the polymerizable unsaturated monomer and the cross-linkable monomer are polymerized on each of the black and color pigments to obtain encapsulated pigments having a large diameter in which each of the black and color pigments is coated with a cross-linked polymer resin.

The cross-linkable monomer may be (meth)acrylate or a vinyl compound.

A content of the cross-linkable monomer may be in a range of 10 to 80 parts by weight, specifically 15 to 60 parts by weight, based on 100 parts by weight of the polymerizable unsaturated monomer. When the content of the cross-linkable monomer is less than 10 parts by weight based on 100 parts by weight of the polymerizable unsaturated monomer, the degree of crosslinkage is too low and thus, the size of the obtained polymer resin is too large. Alternatively, when the content of the cross-linkable monomer is greater than 80 parts by weight based on 100 parts by weight of the polymerizable unsaturated monomer, a degree of crosslinkage is too high, a size of the obtained polymer resin is too small, and thus the pigment may not be fully encapsulated.

Also, the polymerization composition may further include a chain-transfer agent, such as a sulfur-containing compound, a phosphorous acid compound, a hypophosphorous acid compound, or an alcohol.

A content of the chain-transfer agent may be in a range of 0.05 to 5 parts by weight, specifically 0.5 to 2 parts by weight, based on 100 parts by weight of the polymerizable unsaturated monomer. When the content of the chain-transfer agent is less than 0.05 parts by weight based on 100 parts by weight of the polymerizable unsaturated monomer, the degree of crosslinkage is too high. Alternatively, when the content of the chain-transfer agent is greater than 5 parts by weight based on 100 parts by weight of the polymerizable unsaturated monomer, the degree of crosslinkage is too low.

In some cases, the polymerization composition may further include other additives, such as an ultra violet (UV) absorbing agent, an antioxidizing agent, a color expression improving agent, or a biocide.

As a result of the polymerization reaction described above, an encapsulated pigment is obtained. That is, when the pigment used is a black pigment, an encapsulated black pigment in which a black pigment is covered with a polymer resin is obtained; alternatively, when the pigment used is a color pigment, an encapsulated color pigment in which a color pigment is covered with a polymer resin is obtained.

In the present embodiment, a volume average diameter and the glass transition temperature of the encapsulated black and color pigments of an ink set are such that text images having a high degree of visuality and clear color images having a wide color gamut without nozzle clogging in an inkjet printing head can be obtained.

The volume average diameter of each of the encapsulated black and color pigments may be dependent on a weight ratio of each of the black and color pigments with respect to the polymer resin coating the black and color pigments.

With respect to the black pigment, a weight ratio of the black pigment with respect to the polymer resin coating the black pigment may be in a range of 20 to 500 wt %, specifically 50 to 400 wt %. With respect to the color pigment, a weight ratio of the color pigment with respect to the polymer resin coating the color pigment is less than the weight ratio the weight ratio of the black pigment with respect to the polymer resin. For example, the weight ratio of the color pigment with respect to the polymer resin may be in a range of 20 to 200%, specifically 50 to 200%. When the weight ratio of the pigment is less than 20% in both cases described above, a content of the polymer resin is too high and a content of the pigment is too small, and thus, an optical density of printed images is decreased. Alternatively, when the weight ratio of the pigment is greater than 500% in both cases described above, the content of the pigment is too high, the pigment is not fully encapsulated and particles of the pigment may agglomerate with each other.

When the volume average diameter of the encapsulated black pigment is greater than the volume average diameter of the encapsulated color pigment, conditions for text printing and conditions for color image printing can be satisfied at the same time.

That is, black pigment is used to print general documents, specifically letters, and thus, the black pigment should have a relatively large volume average diameter to distinctively print letters because the size of particles of pigment increases as the optical density increases. Alternatively, color pigment is used for fine image printing and thus a nozzle size of a printer head is small. Accordingly, the volume average diameter of the color pigment should also be small.

Meanwhile, in general, the Fox Equation is used to obtain a glass transition temperature of a copolymer based on a glass transition temperature of a homopolymer. A type and weight ratio of an unsaturated monomer can be controlled by using the Fox Equation, and thus a glass transition temperature of the encapsulation pigment can be controlled.

$$1/T_g = w_1/T_{g1} + w_2/T_{g2} + \ldots + w_n/T_{gn}$$

where $w_1, w_2, \ldots w_n$ denote a weight fraction of monomers, and $T_{g1}, T_{g2}, \ldots T_{gn}$ denote $T_g$ of a homopolymer of the monomers.

In an ink set in which polymer resins encapsulating black and color pigments have different glass transition temperatures, the encapsulated black pigment including a polymer resin having the higher glass transition temperature is used to print text, and the encapsulated color pigment including the polymer resin having the lower glass transition temperature is used to print images.

That is, an encapsulated black pigment including a polymer resin having a high glass transition temperature is hard, and thus pigment bleeding on a printing medium does not occur and a thickness of a printed result is not changed after printing. Accordingly, the encapsulated black can be used to print letters having a high optical density. Alternatively, an encapsulated color pigment including a polymer resin having a low glass transition temperature runs well on a printing medium and thus can be homogeneously spread on a printing medium after printing. Accordingly, the encapsulated color pigment can be used to print images having durability and excellent print gloss. Thus, the ink set according to the present embodiment can be used to print clear text and clear images.

For example, $D_1$ of the encapsulated black pigment may be in a range of 120 to 150 nm, specifically 135 to 150 nm, and $T_{g1}$ of the encapsulated black pigment may be in a range of 30 to 50° C., specifically 35 to 50° C.

When $D_1$ of the encapsulated black pigment is less than 120 nm, the printed result has a low optical density and thus a low image quality. Alternatively, when $D_1$ of the encapsulated black pigment is greater than 150 nm, the nozzle clogging phenomenon occurs.

When $T_{g1}$ of the encapsulated black pigment is less than 30° C., the black pigment runs well and thus a line gloss of printed letters may be degraded. Alternatively, when $T_{g1}$ of the encapsulated black pigment is greater than 50° C., an adhesive force of the black pigment with respect to a printing medium may be decreased.

Meanwhile, $D_2$ of the encapsulated color pigment may be in a range of 90 to 120 nm, specifically 100 to 120 nm, and $T_{g2}$ of the encapsulated color pigment may be in a range of 10 to 30° C., specifically, 15 to 30° C.

When $D_2$ of the encapsulated color pigment is less than 100 nm, the optical density is too low and the printed text is not clear. Alternatively, when $D_2$ of the encapsulated color pigment is greater than 120 nm, the nozzle clogging phenomenon occurs.

When $T_{g2}$ of the encapsulated color pigment is less than 10° C., the color pigment may be attached to a surface of a printing head and flowability of ink may be degraded. Alternatively, when $T_{g2}$ of the encapsulated color pigment is greater than 30° C., the color pigment may not run well and thus, a white hole effect occurs and a quality of printed images may be degraded.

In this regard, $D_1$-$D_2$ may be in a range of 1 to 60 nm, specifically 5 to 40 nm, and $T_{g1}$-$T_{g2}$ may be in a range of 1 to 40° C., specifically 5 to 35° C.

When $D_1$-$D_2$ is less than 1 nm or greater than 60 nm, the optical density of text printed using the encapsulated black pigment is decreased and nozzles for the encapsulated color pigment may be clogged.

When $T_{g1}$-$T_{g2}$ is less than 1° C. or greater than 40° C., line gloss of text printed using the encapsulated black pigment may be decreased or the encapsulated black pigment may not be fused well, and the optical density of images printed using the encapsulated color pigment is decreased due to a white hole effect.

The ink set according to the present embodiment includes: an ink composition including an encapsulated black pigment in which a black pigment is covered with a polymer resin; and an ink composition including an encapsulated color pigment in which a color pigment is coated with a polymer resin.

A content of the encapsulated black pigment may be in a range of 1 to 20 parts by weight, specifically 2 to 10 parts by weight, and more specifically, 3 to 7 parts by weight, based on 100 parts by weight of the ink composition including the encapsulated black pigment. A content of the encapsulated color pigment may be in a range of 1 to 20 parts by weight, specifically 2 to 10 parts by weight, and more specifically, 3 to 7 parts by weight, based on 100 parts by weight of the ink composition including the encapsulated color pigment.

When the content of the encapsulated black pigment is less than 1 part by weight based on 100 parts by weight of the ink composition including the encapsulated black pigment, sufficient optical density cannot be obtained; alternatively, when the content of the encapsulated black pigment is greater than 20 parts by weight based on 100 parts by weight of the ink composition including the encapsulated black pigment, a viscosity of the ink composition is too high, and thus an inkjet ejection performance may be degraded. When the content of the encapsulated color pigment is less than 1 part by weight based on 100 parts by weight of the ink composition including the encapsulated color pigment, sufficient optical density cannot be obtained; alternatively, when the content of the encapsulated color pigment is greater than 20 parts by weight based on 100 parts by weight of the ink composition including the encapsulated color pigment, the viscosity of the ink composition is too high, and the ink may not be ejected easily.

A solvent used in each of the ink composition including the encapsulated black pigment and the ink composition including the encapsulated color pigment may be a water-soluble solvent, such as water. The solvent may further include at least one type of an organic solvent. The content of the solvent may be in a range of 80 to 99 parts by weight, specifically 85 to 98 parts by weight, and more specifically 90 to 97 parts by weight, based on 100 parts by weight of a corresponding ink composition.

When the content of the solvent is less than 80 parts by weight based on 100 parts by weight of the corresponding ink composition, a viscosity of the ink composition is too high and ejecting efficiency can be decreased. Alternatively, when the content of the solvent is greater than 99 parts by weight based on 100 parts by weight of the corresponding ink composition, surface tension of the ink composition is increased and thus an ejecting efficiency can be decreased.

The organic solvent that is included in the solvent may include at least one material selected from the group consisting of monohydric alcohol, ketone, ester, polyhydric alcohol, a nitrogen-containing compound, and a sulfur-containing compound.

The monohydric alcohol included in the organic solvent may be methyl alcohol, ethyl alcohol, n-propyl alcohol, isopropyl alcohol, n-butyl alcohol, sec-butyl alcohol, t-butyl alcohol or isobutyl alcohol. The ketone may be acetone, methylethyl ketone, diethyl ketone or diacetone alcohol. The ester may be methyl acetate, ethyl acetate or ethyl lactate. The polyhydric alcohol may be ethylene glycol, diethylene glycol, triethylene glycol, propylene glycol, butylene glycol, 1,4-buthandiol, 1,2,4-buthantriol, 1.5-pentanediol, 1,2,6-hexanetriol, hexylene glycol, glycerol, glycerol ethoxylate or trimethylol propane ethoxylate. The monohydric alcohol included in the organic solvent controls a surface tension of ink, and thus can improve permeation and dot formation characteristics on a printing medium such as paper for professional or nonprofessional use and drying properties of the printed image. The polyhydric alcohol and derivatives thereof are not easily evaporated, and lower the freezing point of the ink, and thus can improve storage stability of the ink and prevent nozzle clogging.

Examples of the nitrogen-containing compound included in the organic solvent include 2-pyrrolidone and N-methyl-2-pyrrolidone, and examples of the sulfur-containing compound include dimethyl sulfoxide, tetramethyl sulfone and thioglycol.

When the organic solvent is used together with the water-based solvent, the content of the organic solvent may be in a range of 0.1 to 130 parts by weight, and specifically 10 to 50 parts by weight, based on 100 parts by weight of water. When the content of the organic solvent is less than 0.1 parts by weight based on 100 parts by weight of water, surface tension of the corresponding ink composition is substantially increased. Alternatively, when the content of the solvent is greater than 130 parts by weight based on 100 parts by weight of water, viscosity of the ink is too high and ejection efficiency can be decreased.

Each of the ink compositions according to the present embodiment may further include various additives to improve properties of the ink composition. For example, each of the ink compositions may include at least one selected from the group consisting of a wetting agent, a dispersing agent, a surfactant, a viscosity modifier, a pH regulator, and an antioxidizing agent. A content of the additives may be in a range of 0.5 to 600 parts by weight, and specifically 10 to 300 parts by weight, based on 100 parts by weight of the corresponding pigment. When the content of the additives is less than 0.5 parts by weight based on 100 parts by weight of the corresponding pigment, an effect of the additives does not occur. Alternatively, when the content of the additives is greater than 600 parts by weight based on 100 parts by weight of the corresponding pigment, storage stability may be decreased.

In particular, the surfactant may be, for example, an ampholytic, an anionic, a cationic or a nonionic surfactant, and any surfactant may be used according to purposes thereof without limitation. The respective surfactants may be used alone or in a combination thereof.

Examples of the ampholytic surfactant include alanine, dodecyldi(aminoethyl)glycine, di(octylaminoethyl)glycine, and N-alkyl-N,N-dimethyl ammonium beitane.

Examples of the anionic surfactant include alkylbenzene sulfonate, a-olefin sulfonate, polyoxyethylenealkyl ether acetate and phosphate ester.

Examples of the cationic surfactant include: an amine salt surfactant such as alkyl amine salt, aminoalcohol fatty acid derivatives, polyamine fatty acid derivatives or imidazoline; and a quaternary ammonium salt surfactant such as alkyltrimethyl ammonium salt, dialkyldimethyl ammonium salt, alkyldimethyl benzylammonium salt, pyridinium salt, alkylisoquinolinium salt, and benzethonium chloride salt.

Examples of the nonionic surfactant include polyoxyethylenealkylether, polyoxyethylenealkylphenylether, and acetylene glycol.

Among the respective surfactants, use of the nonionic surfactant is desirable due to excellent antifoaming properties thereof.

The nonionic surfactant may be selected from the SURFYNOL series of Air Products, Inc. having an acetylenic ethoxylated diol structure, the TERGITOL series of Union Carbide Co. having a polyethylene oxide or polypropylene oxide structure, the Tween series having a polyoxyethylene sorbitan fatty acid ester structure, etc.

The ink composition according to the present embodiment may have a surface tension of 15 to 70 dyne/cm, specifically 25 to 55 dyne/cm at 20° C. and a viscosity of 1 to 20 cps, specifically 1.5 to 3.5 cps at 20° C. When the surface tension is outside the range above, priming efficiency may be decreased, and when the viscosity is outside the range above, an ejecting process may not be properly performed.

Also, the ink set according to the present embodiment can be used in an ink receiving unit of an inkjet recording apparatus or a cartridge of an inkjet printer.

The inkjet recording apparatus according to the present embodiment may include a thermal head from which ink droplets are ejected by vapor pressure generated by heating an ink composition, a piezo head from which ink droplets are ejected by a piezo device, a disposable head, or a permanent head. Also, the inkjet recording apparatus may be a scanning type printer or an array type printer and can be used for a desktop, textile or industrial purpose. Head types, printer types and uses of the inkjet recording apparatus are merely examples, and the use of the inkjet recording apparatus is not limited thereto.

FIG. 1 is a perspective view illustrating an inkjet recording apparatus according to an embodiment of the present general inventive concept.

Referring to FIG. 1, the inkjet recording apparatus according to the current embodiment of the present general inventive concept includes a printer 5 including an inkjet printer cartridge 11 having an ink composition that contains a macrochromophore colorant and pseudo-colorant additives. A printer cover 8 is connected to a main body 13 of the printer 5. An engaging portion of a movable latch 10 protrudes through a hole 7. The movable latch 10 engages with a fixed latch 9 that is coupled to an inner side of the printer cover 8 when the printer cover 8 is closed. The printer cover 8 has a recess 14 in a region corresponding to the engaging portion of the movable latch 10 protruding through the hole 7. The inkjet printer cartridge 11 is positioned such that ink can be ejected onto paper 3 that passes under the ink cartridge 11.

Figure 2:
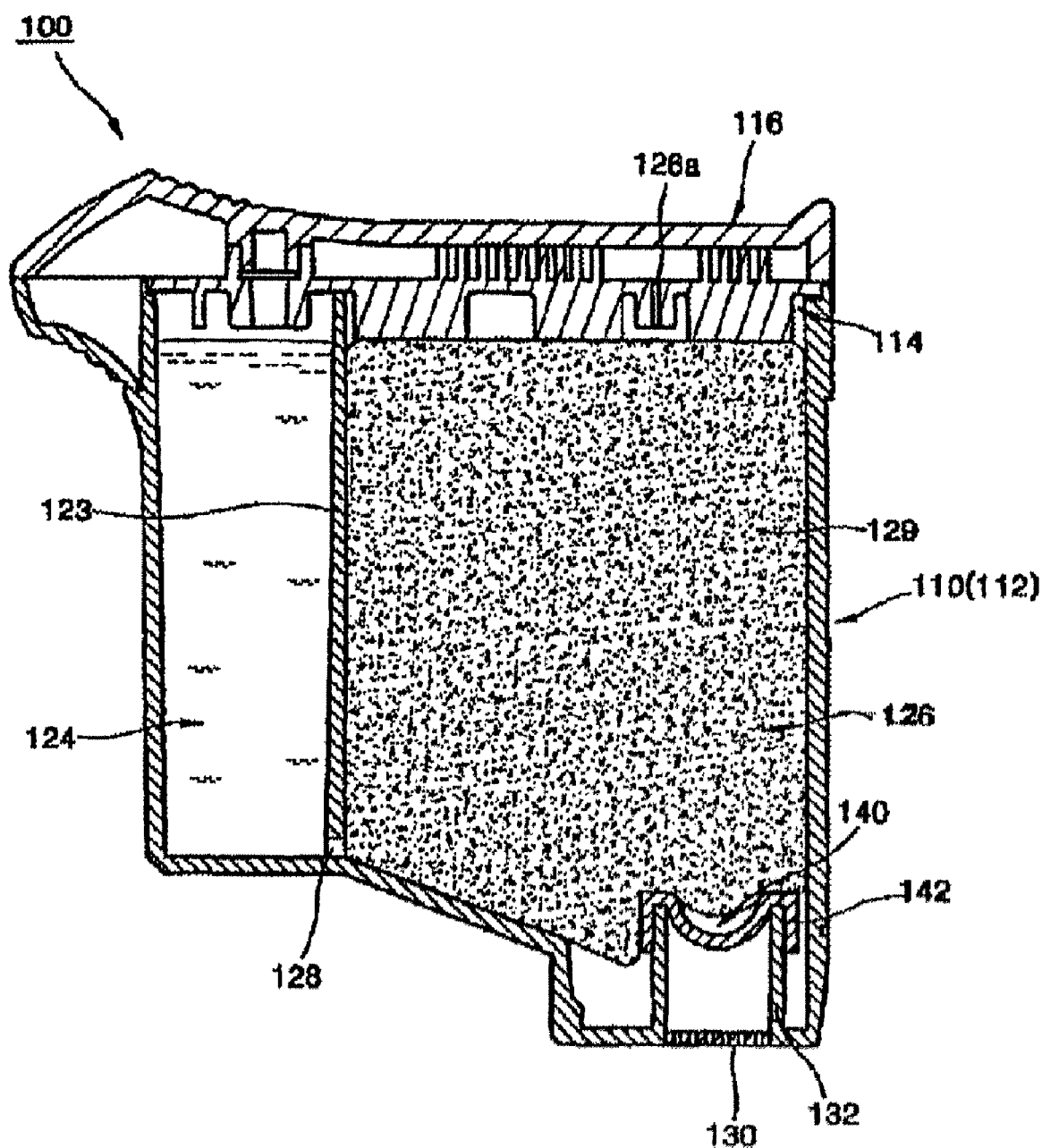
FIG. 2 is a cross-sectional view illustrating an ink cartridge according to an embodiment of the present general inventive concept.

FIG. 2 is a cross-sectional view illustrating an ink cartridge 100 of an inkjet printer, according to an embodiment of the present general inventive concept. The ink cartridge 100 according to the current embodiment may include the ink set according to the present general inventive concept. Referring to FIG. 2, the ink cartridge 100 according to the current embodiment of the present general inventive concept includes an ink cartridge main body 110 including an ink storage tank 112, an inner cover 114 to cover a top portion of the ink storage tank 112, and an outer cover 116 that is separated by a predetermined gap from the inner cover 114 and seals the ink storage tank 112 and the inner cover 114.

The ink storage tank 112 is divided into a first chamber 124 and a second chamber 126 by a vertical barrier wall 123. An ink passage 128 between the first chamber 124 and the second chamber 126 is formed in a bottom portion of the vertical barrier wall 123. The first chamber 124, the sponge 129, and the second chamber 126 are filled with ink. A vent hole 126a corresponding to the second chamber 126 is formed in the inner cover 114.

A filter 140 is disposed in a lower portion of the second chamber 126, so that ink impurities and fine bubbles are filtered to prevent ejection holes of a printer head 130 at the bottom of the ink cartridge 100 from being clogged. A hook 142 is disposed at the edge of the filter 140 and is coupled to a top portion of a standpipe 132. Thus, ink is ejected from the ink storage tank 120 onto a printing medium in a liquid-drop form through the ejection holes of the printer head 130.

The present general inventive concept will be described in further detail with reference to the following examples. These examples are for illustrative purposes only and are not intended to limit the scope of the present general inventive concept.

Evaluation of Volume Average Diameter

A volume average diameter of encapsulated pigments prepared according to Preparation Examples 1-16 were evaluated with an evaluation device (manufactured by HORIBA Co, Product Name: LA-910) using a laser light scattering distribution analyzing method.

Evaluation of Glass Transition Temperature ($T_g$)

A glass transition temperature of a polymer resin of each of the encapsulated pigments prepared according to Preparation Examples 1-16 was evaluated with an evaluation device DTA/DSC 703 (produced by Baehr Co., Germany) at 1 atm at a temperature ranging from −50 to 200° C.

Preparation Example 1

10 g (solid state) of Cabojet 300, 12 g of styrene, 15 g of ethyl methacrylate, 10 g of hexyl methacrylic acid, 0.3 g of ethylene glycol dimethacrylate, 1 g of BYK-190, 0.5 g of Solsperse-46000, and 110 g of water were added to a reactor. Then, 40 g of glass beads were added thereto and the reaction materials were stirred with a Dispermat for 17 hours to form a monomer-pigment emulsion. Separately, 0.3 g of solid potassium persulfate was added to a container containing 40 ml of water at 90° C., and the obtained monomer-pigment emulsion was added thereto. Then, the resultant mixture was stirred for 2 hours at 90° C., cooled to room temperature, and neutralized with KOH until a pH of the mixture was increased to 9. The obtained solution was filtered with a 200 mesh filter, thereby obtaining a suspension of an encapsulated black pigment. The suspension of the encapsulated black pigment had a volume average diameter of 146 nm and a glass transition temperature of 46° C.

Preparation Example 2

A suspension of an encapsulated black pigment was prepared in the same manner as in Preparation Example 1, except that 10 g (solid state) of Cabojet 300, 4 g of styrene, 5 g of hexylmethacrylic acid, 1 g of methacrylic acid, 0.1 g of ethylene glycol dimethacrylate, 0.3 g of BYK-190, 0.17 g of Solsperse-46000, and 130 g of water were used. The obtained suspension of the encapsulated black pigment had a volume average diameter of 118 nm and a glass transition temperature of 46° C.

Preparation Example 3

A suspension of an encapsulated black pigment was prepared in the same manner as in Preparation Example 1, except that 10 g (solid state) of Cabojet 300, 12 g of styrene, 9 g of hexyl methacrylic acid, 6 g of methacrylic acid, 0.2 g of ethylene glycol dimethacrylate, 1 g of BYK-190, 0.5 g of Solsperse-46000, and 130 g of water were used. The obtained suspension of the encapsulated black pigment had a volume average diameter of 143 nm and a glass transition temperature of 26° C.

Preparation Example 4

A suspension of an encapsulated black pigment was prepared in the same manner as in Preparation Example 1, except that 10 g (solid state) of Cabojet 300, 8 g of styrene, 5 g of hexyl methacrylic acid, 6 g of methacrylic acid, 0.2 g of ethylene glycol dimethacrylate, 1 g of BYK-190, 0.5 g of Solsperse-46000, and 130 g of water were used. The obtained suspension of the encapsulated black pigment had a volume average diameter of 117 nm and a glass transition temperature of 23° C.

Example 1

Preparation of Ink Composition Including Encapsulated Black Pigment

| | |
|---|---|
| The suspension of the encapsulated black pigment prepared according to Preparation Example 1 | 40 parts by weight |
| Glycerol | 2 parts by weight |
| Diethyleneglycol | 3 parts by weight |
| Nonionic surfactant (Product Nambe: Tween 40, produced by Aldrich Co.) | 0.6 parts by weight |
| Water (deionized water) | 55 parts by weight |

Comparative Examples 1-3

Preparation of Ink Composition including Encapsulated Black Pigment

Ink compositions were prepared in the same manner as in Example 1, except that the suspensions prepared according to Preparation Examples 2-4 were used instead of the suspension prepared according to Preparation Example 1.

Preparation Example 5

A suspension of an encapsulated cyan pigment was prepared in the same manner as in Preparation Example 1, except that 10 g of phthalocyanine blue (C.I. Pigment Blue 15:3), 4 g of styrene, 3 g of hexyl methacrylic acid, 2 g of methacrylic acid, 0.15 g of ethylene glycol dimethylacrylate, 0.25 g of BYK-190, 0.13 g of Solsperse-46000, and 130 g of water were used. The obtained suspension of the encapsulated cyan pigment had a volume average diameter of 101 nm and a glass transition temperature of 25° C.

Preparation Example 6

A suspension of an encapsulated cyan pigment was prepared in the same manner as in Preparation Example 1, except that 10 g of phthalocyanine blue (C.I. Pigment Blue 15:3), 12 g of styrene, 9 g of hexyl methacrylic acid, 6 g of methacrylic acid, 0.2 g of ethylene glycol dimethacrylate, 1 g of BYK-190, 0.5 g of Solsperse-46000, and 110 g of water were used. The obtained suspension of the encapsulated cyan pigment had a volume average diameter of 146 nm and a glass transition temperature of 26° C.

Preparation Example 7

A suspension of an encapsulated cyan pigment was prepared in the same manner as in Preparation Example 1, except that 10 g of phthalocyanine blue (C.I. Pigment Blue 15:3), 4 g of styrene, 5 g of hexyl methacrylic acid, 1 g of methacrylic acid, 0.15 g of ethylene glycol dimethacrylate, 0.25 g of BYK-190, 0.13 g of Solsperse-46000, and 135 g of water were used. The obtained suspension of the encapsulated cyan pigment had a volume average diameter of 103 nm and a glass transition temperature of 43° C.

Preparation Example 8

A suspension of an encapsulated cyan pigment was prepared in the same manner as in Preparation Example 1, except that 10 g of phthalocyanine blue (C.I. Pigment Blue 15:3), 12 g of styrene, 15 g of hexyl methacrylic acid, 3 g of methacrylic acid, 0.3 g of ethylene glycol dimethacrylate, 1 g of BYK-190, 0.5 g of Solsperse-46000, 110 g of water were used. The obtained suspension of the encapsulated cyan pigment had a volume average diameter of 143 nm and a glass transition temperature of 42° C.

Example 2

Preparation of Ink Composition Including Encapsulated Cyan Pigment

An ink composition including an encapsulated cyan pigment was prepared in the same manner as in Example 1, except that the suspension of the encapsulated cyan pigment prepared according to Preparation Example 5 was used instead of the suspension of the encapsulated black pigment prepared according to Preparation Example 1.

Comparative Examples 4-6

Ink compositions were prepared in the same manner as in Example 2, except that suspensions prepared according to Preparation Examples 6-8 were used instead of the suspension prepared according to Preparation Example 5.

Preparation Example 9

A suspension of an encapsulated magenta pigment was prepared in the same manner as in Preparation Example 5, except that quinacridone (C.I. Pigment Red 112) was used instead of phthalocyanine blue. The obtained suspension of the encapsulated magenta pigment had a volume average diameter of 112 nm and a glass transition temperature of 25° C.

Preparation Example 10

A suspension of an encapsulated magenta pigment was prepared in the same manner as in Preparation Example 6, except that quinacridone (C.I. Pigment Red 112) was used instead of phthalocyanine blue. The obtained suspension of the encapsulated magenta pigment had a volume average diameter of 148 nm and a glass transition temperature of 23° C.

Preparation Example 11

A suspension of an encapsulated magenta pigment was prepared in the same manner as in Preparation Example 7, except that quinacridone (C.I. Pigment Red 112) was used instead of phthalocyanine blue. The obtained suspension of the encapsulated magenta pigment had a volume average diameter of 110 nm and a glass transition temperature of 44° C.

Preparation Example 12

A suspension of an encapsulated magenta pigment was prepared in the same manner as in Preparation Example 8, except that quinacridone (C.I. Pigment Red 112) was used instead of phthalocyanine blue. The obtained suspension of the encapsulated magenta pigment had a volume average diameter of 145 nm and a glass transition temperature of 47° C.

Example 3

Preparation of Ink Composition Including Encapsulated Magenta Pigment

An ink composition including an encapsulated magenta pigment was prepared in the same manner as in Example 1, except that the suspension of the encapsulated magenta pigment prepared according to Preparation Example 9 was used instead of the suspension of the encapsulated black pigment prepared according to Preparation Example 1.

Comparative Examples 7-9

Ink compositions were prepared in the same manner as in Example 2, except that suspensions prepared according to Preparation Examples 10-12 were used instead of the suspension of the encapsulated black pigment according to Preparation Example 1.

Preparation Example 13

A suspension of an encapsulated yellow pigment was prepared in the same manner as in Preparation Example 5, except that C.I. Pigment Yellow 16 was used instead of phthalocyanine blue. The obtained suspension of the encapsulated yellow pigment had a volume average diameter of 112 nm and a glass transition temperature of 25° C.

Preparation Example 14

A suspension of an encapsulated yellow pigment was prepared in the same manner as in Preparation Example 6, except that C.I. Pigment Yellow 16 was used instead of phthalocyanine blue. The obtained suspension of the encapsulated yellow pigment had a volume average diameter of 142 nm and a glass transition temperature of 23° C.

Preparation Example 15

A suspension of an encapsulated yellow pigment was prepared in the same manner as in Preparation Example 7, except that C.I. Pigment Yellow 16 was used instead of phthalocyanine blue. The obtained suspension of the encapsulated yellow pigment had a volume average diameter of 113 nm and a glass transition temperature of 39° C.

Preparation Example 16

A suspension of an encapsulated yellow pigment was prepared in the same manner as in Preparation Example 8, except that C.I. Pigment Yellow 16 was used instead of phthalocyanine blue. The obtained suspension of the encapsulated yellow pigment had a volume average diameter of 139 nm and a glass transition temperature of 41° C.

Example 4

Preparation of Ink Composition Including Encapsulated Yellow Pigment

An ink composition including an encapsulated yellow pigment was prepared in the same manner as in Example 1, except that the suspension of an encapsulated yellow pigment prepared according to Preparation Example 13 was used instead of the suspension of the encapsulated black pigment according to Preparation Example 1.

Comparative Examples 10-12

Ink compositions were prepared in the same manner as in Example 2, except that suspensions prepared according to Preparation Examples 14-16 were used instead of the suspension of the encapsulated black pigment according to Preparation Example 1.

<Evaluation of Optical Density and Line Gloss of Ink Composition Including Encapsulated Black Pigment>

Each of the ink compositions prepared according to Example 1 and Comparative Examples 1-3 was used to print with a Samsung ink cartridge (a size of a black nozzle was 7 μm, a size of a color nozzle was 2 μm), and an optical density of each of the ink compositions was measured with a Gretag-Macbeth D196. A degree of gloss of an edge of a dotted line was identified with the naked eye. The results are illustrated in Table 1 below.

"○" denotes that the edge of the dotted line is glossy

"Δ" denotes that dot bleeding partially occurs at the edge of the dotted line

"x" denotes that the edge of the dotted line is not glossy and dot bleeding occurs at the edge of the dotted line

TABLE 1

|  | Example | Comparative Example No. | | |
| --- | --- | --- | --- | --- |
|  | 1 | 1 | 2 | 3 |
| Optical density (OD) | 1.32 | 1.10 | 1.28 | 1.01 |
| Line gloss | ○ | ○ | X | Δ |

Referring to Table 1, as the volume average diameter of an encapsulated black pigment included in the ink composition prepared according to Example 1 was increased, OD was increased and a text was better expressed. In addition, as the glass transition temperature of the encapsulated black pigment used in Example 1 was increased, a level of the dot bleeding was decreased, and thus the edge dots were glossy and the printed text was clearer.

<Evaluation of Optical Density, Color Gamut, and Nozzle Clogging of Encapsulated Color Pigment>

An optical density of each of the ink compositions prepared according to Examples 2-4 and Comparative Examples 4-12 was measured with a GretagMacbeth D196, and a color gamut of the ink composition was measured to obtain a color expressing capability. In addition, each of the ink compositions including the encapsulated color pigment was used to print an image by using a Samsung ink cartridge (the size of a black nozzle was 7 pl, the size of a color nozzle was 2 pl). Then, the ink composition was ejected through nozzles and the number of clogged nozzles was measured to identify a degree of nozzle clogging. The results are illustrated in Table 2 below.

"○" denotes that the percentage of the clogged nozzles<5%

"Δ" denotes that 5%≦the percentage of the clogged nozzles<10%

"x" denotes that the percentage of the clogged nozzles≧10%

TABLE 2

|  | Example | | | Comparative Example | | | | | | | | |
| --- | --- | --- | --- | --- | --- | --- | --- | --- | --- | --- | --- | --- |
| No. | 2 | 3 | 4 | 4 | 7 | 10 | 5 | 8 | 11 | 6 | 9 | 12 |
| Type of Color | C | M | Y | C | M | Y | C | M | Y | C | M | Y |
| OD | 0.98 | 1.01 | 0.78 | 1.12 | 1.24 | 0.92 | 0.75 | 0.82 | 0.62 | 1.06 | 1.08 | 0.82 |
| Color gamut |  | 10213 |  |  | 11532 |  |  | 8823 |  |  | 10923 |  |
| Nozzle clogging | ○ | ○ | ○ | X | X | X | ○ | ○ | ○ | Δ | Δ | Δ |

Referring to Table 2, when the same encapsulated color pigment was used, as the glass transition temperature decreased and the volume average diameter increased, a white hole effect was decreased and thus, the color concentration was increased and the color gamut was widened. However, as the volume average diameter increased, nozzle clogging occurred more often. Accordingly, an encapsulated color pigment requires relatively low volume average diameter and relatively low glass transition temperature.

An ink set including an ink composition including: an encapsulated black pigment in which a polymer resin is coated on a black pigment; and an ink composition including an encapsulated color pigment in which a polymer resin is coated on a color pigment can be used to print text having a high degree of visuality and a clear color image having a wide color gamut without nozzle clogging in an inkjet printing head, wherein the volume average diameter and glass transition temperature of the encapsulated black and color pigments are controlled.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. An ink set comprising
    an ink composition including an encapsulated black pigment in which a black pigment is coated with a polymer resin; and
    an ink composition including an encapsulated color pigment in which a color pigment is coated with a polymer resin,
    wherein a volume average diameter ($D_1$) of the encapsulated black pigment is in a range of 120 to 150 nm, a glass transition temperature ($T_{g1}$) of the encapsulated black pigment is in a range of 30 to 50° C., a volume average diameter ($D_2$) of the encapsulated color pigment is in a range of 90 to 120 nm, and a glass transition temperature ($T_{g2}$) of the encapsulated color pigment in a range of 10 to 30'C, and
    wherein $D_1$-$D_2$ is in a range of 1 to 60 nm, and $T_{g1}$-$T_{g2}$ is in a range of 1 to 40° C.

2. The ink set of claim 1, wherein the black pigment comprises:
    carbon black.

3. The ink set of claim 1, wherein the color pigment is selected from the group consisting of a cyan pigment, a magenta pigment, and a yellow pigment.

4. The ink set of claim 3, wherein the cyan pigment is selected from the group consisting of C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6; the yellow pigment is selected from the group consisting of C.I. Pigment Yellow 1, C.I. Pigment Yellow 3, C.I. Pigment Yellow 13, C.I. Pigment Yellow 16, and C.I. Pigment Yellow 83; and the magenta pigment is selected from the group consisting of C.I. Pigment Red 5, C.I. Pigment Red 7, C.I. Pigment Red 12, C.I. Pigment Red 48, C.I. Pigment Red 57, C.I. Pigment Red 112 and C.I. Pigment Violet 19.

5. The ink set of claim 1, wherein a volume average diameter of each of the black and color pigments is in a range of 5 to 110 nm.

6. The ink set of claim 1, wherein the polymer resin comprises:
    at least one material selected from the group consisting of a vinyl chloride resin, an acetic acid resin, an vinyl acetic acid resin, a vinyl chloride/vinyl acetic acid copolymer resin, a polyvinyl acetal resin, a cellulose resin, an acryl resin, a polyester resin, a poly urethane resin, and a poly amide resin.

7. The ink set of claim 1, wherein each of the ink compositions further comprises:
    a solvent or an additive.

8. The ink set of claim 1, wherein each of the polymer resin coated on the black pigment and the polymer resin coated on the color pigment is formed by polymerizing a polymerization composition that comprises a polymerizable unsaturated monomer, a water-soluble medium, a pigment, and a polymerization initiator.

9. The ink set of claim 8, wherein the polymerization reaction is an emulsion polymerization reaction or a suspension polymerization reaction.

10. The ink set of claim 8, wherein the polymerizable unsaturated monomer comprises at least one material selected from the group consisting of vinyl aromatichydrocarbone, a (meth)acrylic acid, (meth)acryl ester, (meth)acrylamide, alkyl-substituted (meth)acryl amide, an N-substituted maleimide, a maleic acid anhydride, (meth) acrylonitrile, methyl vinyl ketone, a vinyl acetate, and vinylidene chloride.

11. An ink cartridge usable with an inkjet recording apparatus, the ink cartridge comprising:
    an ink storage tank to store an ink set, the inkset comprising:
        an ink composition including an encapsulated black pigment in which a black pigment is coated with a polymer resin; and
        an ink composition including an encapsulated color pigment in which a color pigment is coated with a polymer resin,
        wherein a volume average diameter ($D_1$) of the encapsulated black pigment is in a range of 120 to 150 nm, a glass transition temperature ($T_{g1}$) of the encapsulated black pigment is in a range of 30 to 50° C., a volume average diameter ($D_2$) of the encapsulated color pigment is in a range of 90 to 120 nm, and a glass transition temperature ($T_{g2}$) of the encapsulated color pigment in a range of 10 to 30° C., and
        wherein $D_1$-$D_2$ is in a range of 1 to 60 nm, and $T_{g1}$-$T_{g2}$ is in a range of 1 to 40° C.

12. An inkjet recording apparatus, comprising:
    a main body; and
    the ink cartridge removably connected to the main body, the ink cartridge comprising:
        an ink storage tank to store an ink set, the inkset comprising:
            an ink composition including an encapsulated black pigment in which a black pigment is coated with a polymer resin; and
            an ink composition including an encapsulated color pigment in which a color pigment is coated with a polymer resin,
            wherein a volume average diameter ($D_1$) of the encapsulated black pigment is in a range of 120 to 150 nm, a glass transition temperature ($T_{g1}$) of the encapsulated black pigment is in a range of 30 to 50° C., a volume average diameter ($D_2$) of the encapsulated color pigment is in a range of 90 to 120 nm, and a glass transition temperature ($T_{g2}$) of the encapsulated color pigment in a range of 10 to 30° C., and wherein $D_1$-$D_2$ is in a range of 1 to 60 nm, and $T_{g1}$-$T_{g2}$ is in a range of 1 to 40° C.

* * * * *